US010152611B2

United States Patent
Hurwitz et al.

(10) Patent No.: US 10,152,611 B2
(45) Date of Patent: Dec. 11, 2018

(54) IDENTIFYING AND PREVENTING LEAKS OF SENSITIVE INFORMATION

(71) Applicant: General Instrument Corporation, Horsham, PA (US)

(72) Inventors: Joshua B. Hurwitz, Niles, IL (US); Zhi Fu, Herndon, VA (US); Douglas A. Kuhlman, Inverness, IL (US)

(73) Assignee: ARRIS Enterprises LLC, Suwanee, GA (US)

( * ) Notice: Subject to any disclaimer, the term of this patent is extended or adjusted under 35 U.S.C. 154(b) by 690 days.

(21) Appl. No.: 13/762,942

(22) Filed: Feb. 8, 2013

(65) Prior Publication Data

US 2014/0230066 A1   Aug. 14, 2014

(51) Int. Cl.
   *G06F 7/04* (2006.01)
   *G06F 21/62* (2013.01)
   *H04L 29/06* (2006.01)
   *G06F 21/55* (2013.01)

(52) U.S. Cl.
   CPC ........ *G06F 21/6263* (2013.01); *G06F 21/556* (2013.01); *H04L 63/0245* (2013.01); *H04L 63/102* (2013.01); *G06F 2221/2117* (2013.01)

(58) Field of Classification Search
   CPC ............. G06F 21/604; G06F 17/30705; G06F 17/30707
   USPC .......................................................... 726/26
   See application file for complete search history.

(56) References Cited

U.S. PATENT DOCUMENTS

| 8,141,127 | B1 | 3/2012 | Mustafa |
| 2006/0272024 | A1 | 11/2006 | Huang et al. |
| 2007/0112845 | A1* | 5/2007 | Gilmour et al. ............... 707/102 |
| 2009/0210504 | A1* | 8/2009 | Shuster ......................... 709/206 |
| 2010/0057720 | A1 | 3/2010 | Kalyan et al. |

(Continued)

FOREIGN PATENT DOCUMENTS

WO   2012/005730 A1   1/2012

OTHER PUBLICATIONS

Carvalho, Vitor R., et al., "Information Leaks and Suggestions: A Case Study using Mozilla Thunderbird", Sixth Conference on Email and Anti-Spam (CEAS), Jul. 2009.

(Continued)

*Primary Examiner* — Samson B Lemma
(74) *Attorney, Agent, or Firm* — Stewart M. Wiener

(57) ABSTRACT

Determining sensitive information and preventing the unauthorized or unintended dissemination of such information are disclosed. Terms are determined from documents associated with users in a network. Distributions among users and relative frequencies with which the terms are used are determined. Link strengths between users are calculated. Based on the distribution of the terms, the relative frequencies of use among the user profiles and link strengths between users conducting information transactions that include the terms, a sensitivity level for each term can be determined. To determine whether a particular information transaction with particular terms may be conducted between two users in the network, a combination of link strength between the users and sensitivity level of the terms with respect to the users or users' profiles are considered. If the information transaction includes terms that are unknown to one of the users, then a warning or alarm can be raised.

10 Claims, 9 Drawing Sheets

(56) References Cited

U.S. PATENT DOCUMENTS

2010/0229246 A1* 9/2010 Warrington et al. ........... 726/28
2012/0047103 A1 2/2012 Marecki et al.
2012/0210388 A1 8/2012 Kolishchak

OTHER PUBLICATIONS

Carvalho, Vitor R., et al., "Preventing Information Leaks in Email", SIAM International Conference on Data Mining (SDM-07), Apr. 2007.
Carvalho, Vitor R., et al., "Ranking Users for Intelligent Message Addressing", European Conference on Information Retrieval, Apr. 2008.
Chari, Suresh, et al., "Using Recommenders for Discretionary Access Control", Web 2.0 Security and Privacy (W2SP). May 2010.
Fule, Peter, et al., "Detecting Privacy and Ethical Sensitivity in Data Mining Results", Twenty-Seventh Australasian Computer Science Conference (ACSC2004), Conferences in Research and Practice in Information Technology, vol. 26, Jan. 2004.
Wang, Qihua, et al., "Data Leakage Mitigation for Discretionary Access Control in Collaboration Clouds", 16th ACM Symposium on Access Control Models and Technologies, Jun. 2011.
PCT Search Report & Written Opinion, Re: Application #PCT/US2014/015331; dated May 8, 2014.
Official Action, Re: Canadian Application No. 2,900,527, dated Sep. 9, 2016.
Official Action, Re: Korean Application No. 10-2015-7024282, dated Jun. 17, 2016.
EP Rule 71(3) Communication: Intention to Grant, Re: EPC Application No. 14708161.6, dated Jun. 29, 2016.
Official Action, Re: Canadian Application No. 2,900,527, dated Aug. 4, 2017.

* cited by examiner

IDENTIFYING AND PREVENTING LEAKS OF SENSITIVE INFORMATION

BACKGROUND

Advances in electronic and digital communication have increased the speed and efficiency with which information can be transmitted or shared. One issue that has arisen due to the speed and ease with which electronic information can be shared involves accidental leaks or distribution of personal or proprietary information to unauthorized or unintended recipients. Accidentally sharing or leaking personal or proprietary information can occur in corporate network environments, as well as in social networking environments.

In the context of a corporate network environment, employees can accidentally release or send proprietary information to other employees, contractors, or outside users who may not be authorized to view or possess such information. For example, a user might use an email client application to address and compose email messages. Such email clients often include auto-complete features to predict and complete an email address of a known contact when only a few letters of the name or address are entered into an address field. When such an email client incorrectly predicts an address, or a user inadvertently selects an address from one of several predicted email addresses, the email message can end up being addressed and sent to an unintended or unauthorized email recipient. In the social network environment context, users may unintentionally publish or share potentially embarrassing postings or personal content to other users of the social network who are not close friends or trusted contacts without knowing.

Various systems exist for determining potential leaks of sensitive information and then generating an appropriate warning or alert that informs the user of the potential leak or prevents the communication from happening altogether. Such systems typically classify information according to various levels of secrecy and designate users who are authorized to receive information at the various levels of secrecy. In such systems, it is possible to screen documents before they are shared; however, all documents may not be classified, such as newly created or authored documents. In addition, for many networks, such as social networks, there may be no existing systematic method for classifying documents and recipients.

Various solutions address these issues by implementing a document similarity test to prevent leaks. In such systems, users are warned when they are about to share documents or other information with recipients who apparently have never been privy to or included on communications involving similar information. Such systems also include various problems. For example, such systems only warn users about the leak of information without indicating which information in their communication might be sensitive.

Additionally, conventional systems also do not account for the scenario in which information shared by one user with another user is not necessarily sensitive. When information is about to be shared between two users who have not previously shared similar information, such information is not necessarily sensitive when both users already know about or possess such information. As such, conventional information control systems have a potentially high false alarm rate related to flagging "sensitive" information that may already be widely known across the network or organization. Thus, individuals who never communicate with one another about such content may already be aware of it due to its widespread distribution One common underlying problem for various systems that are developed to address the unintentional or unauthorized sharing of sensitive information is that they require a large amount of human intervention to identify information that must be controlled. Accordingly, when new content is introduced into a network, a network administrator, or other user, responsible for or interested in managing information flow in the network would need to determine the sensitivity level of each content item, and then identify users who will be authorized to access, view, or receive such content. Such conventional systems and techniques are slow manual processes that are often overly restrictive or allow too much information to be leaked.

DETAILED DESCRIPTION

Figure 1:
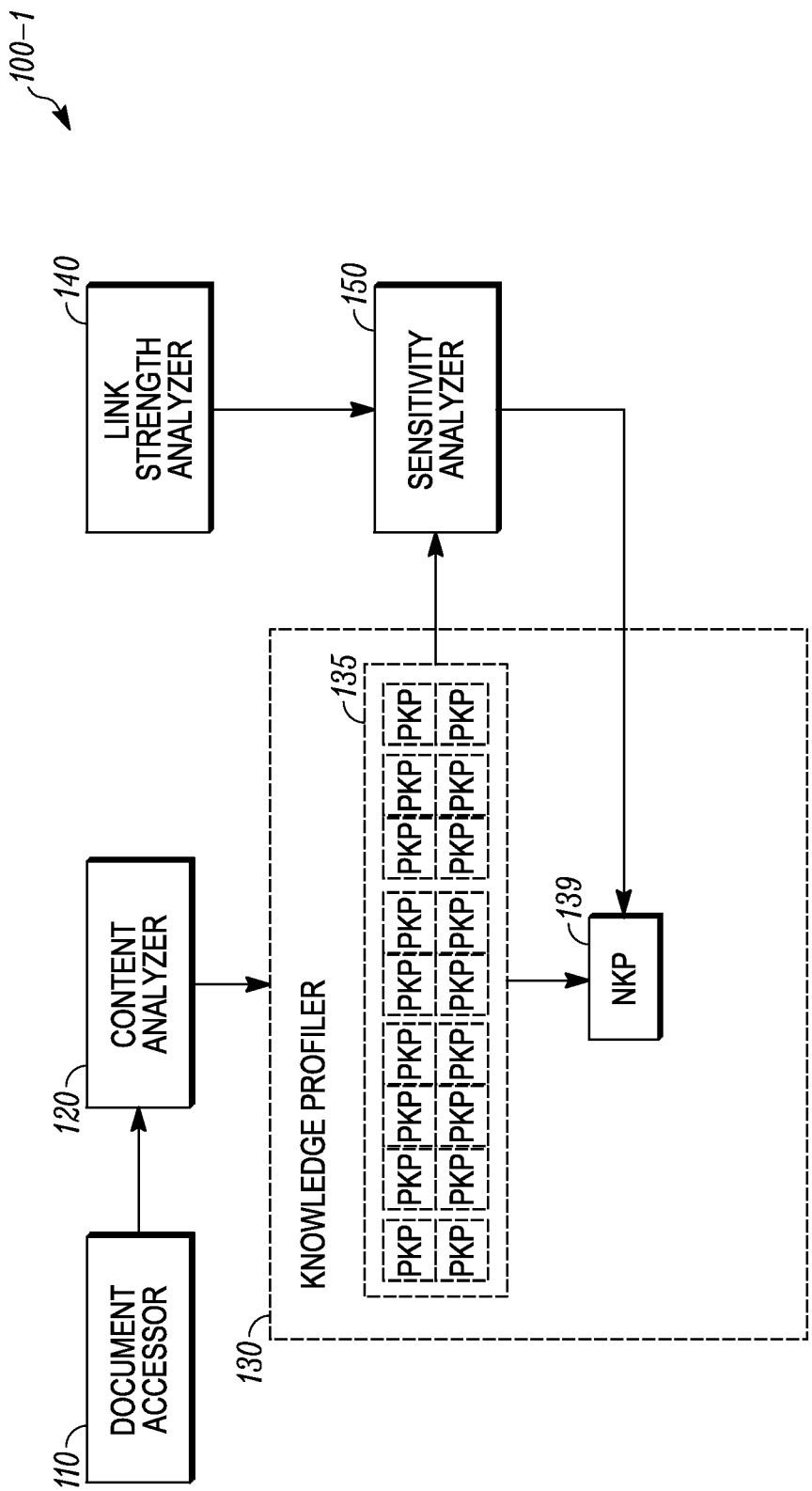
FIG. 1 is a schematic of a system for determining and managing the distribution of sensitive information according to one embodiment of the present disclosure.

Described herein are techniques for systems and methods for determining and managing the distribution of sensitive information among users of one or more networks. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

One embodiment of the present disclosure includes extracting terms from many documents for many profiles, where each of the profiles is associated with a particular user using a network of electronics devices, and generating associated inferred meanings for the terms in each of the profiles, based on usages of the terms in the documents. Such embodiments also can also include, for each profile, generating categorical terms based on the inferred meanings. The categorical terms can categorize the plurality of terms based on the associated inferred meanings. One related embodiment can also include generating associated categorical term frequencies based on associated frequencies of term occurrences of terms associated with the categorical terms in each of the profiles. Each of the associated categorical term frequencies can be associated with one of the categorical terms. Such embodiments can also include determining sensitivity level values for the categorical terms based on the associated categorical term frequencies, and storing the sensitivity level values for the categorical terms. The plurality of sensitivity level values can be used to analyze whether an information transaction comprising at least one of the of terms is permitted.

Another embodiment of the present disclosure includes receiving terms from multiple documents from multiple electronics devices for multiple profiles, where each profile can be associated with a particular user and with multiple electronic devices, using a network of electronics devices, and generating categorical terms that categorize the plurality of terms based on syntactic meanings of the plurality of terms. Each user can be associated with multiple electronic devices. Various embodiments can also include generating associated categorical term frequencies based on a frequency of usage of terms associated with the categorical terms. Each associated categorical term frequency can be associated with one of the categorical terms. Such embodiments can also include determining link strength values for pairs of users based on an organization chart of the users, wherein each of the link strength values describe a relationship between an associated pair of users. Each link strength value describes a relationship between an associated pairs of users. Related embodiments can also include determining sensitivity level values for the categorical terms based on the associated categorical term frequencies and the link strength values pairs of users of the system. Other related embodiments can include storing the sensitivity level values for the categorical terms. The sensitivity level values can be used to analyze whether an information transaction comprising at least one of the plurality of terms is allowable.

Embodiments of the present disclosure include systems, methods, and apparatuses for determining sensitive information and preventing dissemination of such sensitive information to unauthorized or unintended recipients. The determination of sensitive information can be based on terms extracted from documents associated with the users of a network. The terms, and the frequency with which they are used in the documents, can be associated with user profiles associated with the users. Based on a distribution of the terms and the distribution of the relative frequencies of use of the terms among the users of the network, one estimate of the sensitivity level of the terms can be determined, e.g., terms that are distributed relatively evenly among users of the network can be considered to be less sensitive, while terms that are unevenly distributed among the users in the network can be considered to be more sensitive.

Other embodiments include other factors when determining the sensitivity of information and whether a communication between two or more users may potentially result in an unintended or unauthorized leak of sensitive information. For example, some embodiments can consider the strength of the link between each pair of users in the network. In one such embodiment, the frequency of communication between each pair of users can be used to estimate the degree to which two users are related. Accordingly, the more frequently two users communicate, the more related or more strongly linked the two users can be considered. The stronger two users are linked to one another, the more likely they will be allowed to share information without the potential of leaking sensitive information. On the other hand, if two users are not strongly linked to one another, then they may not be allowed to share information that is considered to be sensitive.

FIG. 1 shows a schematic of a system 100-1 for determining sensitive information and preventing dissemination of such sensitive information to unauthorized or unintended recipients. Embodiments of the present disclosure, such as that shown in system 100-1 of FIG. 1, can include multifactorial approaches using individual and global characteristics of users and the network in which the users operate to determine the potential for unauthorized or unintended dissemination of sensitive information. Such systems can analyze the overall distribution of various types of information over the network to determine an estimated sensitivity level. In view of the estimated sensitivity level, the system 100-1 can also determine whether or not an intended or potential recipient of the information is likely to be authorized to receive or already be aware of such information before allowing the information transaction to occur.

As shown, system 100-1 can include a document accessor 110 coupled to a content analyzer 120. Document accessor 110 can gather information from multiple documents associated with one or more users. For example, data accessor 110 can retrieve documents from different data sources, such as a user's email account, file management server, or client computer, etc., and associate all such documents with the user, such as with a user profile for the user. In addition, the documents may also include information transaction histories associated with users. As used herein, the term document can refer to any transient or non-transient electronic form of data including, but not limited to, email, text files, spreadsheet files, instant messages, text messages, social media messages/posts, video files, sound files, and image files. Electronic interactions or actions instigated or initiated by a user to send, disseminate, or share such documents are referred to herein as information transactions. For example, information transactions can include email messages, instant messenger messages, text messages, intranet homepage posts, social media status updates, TWITTER® posts, and any of such information transactions which include links to or attachments of document files.

The document accessor 110 can send, or provide access to, documents to the content analyzer 120. The content analyzer 120 can include functionality for determining the content of each of the documents by extracting terms, such as keywords, or descriptors (e.g., metadata), from the documents. In other embodiments, the content analyzer 120 can receive or retrieve previously determined terms from the documents. For example, the content analyzer 120 can access a data store of terms previously determined during or after the creation of the documents. The content analyzer 120 may also analyze the terms and the semantic context in which the terms are used to determine a descriptive categorical term. The descriptive categorical term may categorize the term based on a number of contexts, projects, subjects, topics, or discussion threads. A descriptive categorical term can be retrieved or generated for each context, project, subject, topic, or discussion thread. Each of the terms extracted from the documents can then be associated with one or more of the categorical terms. Accordingly, multiple terms in the documents can be associated with one or more common categorical terms. Similarly, each document can include multiple terms associated with multiple categorical terms.

In related embodiments, each of the terms and/or the categorical terms determined from or identified in the documents associated with a particular user, can also be associated with the particular user or a user profile associated with that particular user. The content analyzer can then send such information to a knowledge profiler 130. The knowledge profiler 130 can store a number of personal knowledge profiles (PKPs) 135. Each PKP 135 can include a number of terms or categorical terms associated with a particular user. The PKPs 135 can also include a measure of the number of times that each term or categorical term is detected in the documents associated with the user. In some embodiments, the measure of the number of times a term or categorical term is detected can include a term frequency value. The "term frequency" can be expressed as a weighting value or as a reduced fraction of the number of times the corresponding term or categorical term occurs in some number of documents, i.e., instances of the term over the number of documents.

The system 100-1 can also include a link strength analyzer 140 to characterize or determine the degree to which one or more users are linked to one another. For example, link strength analyzer 140 can analyze the frequency a user interacts (e.g., communicates or shares information) with another user. In some embodiments, link strength analyzer 140 can monitor network traffic to determine how often users interact with one another. Accordingly, the link strength analyzer 140 can determine that two users who communicate once or more on a daily basis are more strongly linked than two users who only communicate once or twice a year. Similarly, the link strength analyzer 140 can determine that two users whose associated PKPs 135 include similar or identical sets of categorical terms are probably strongly linked, as compared to two users whose associated PKPs 135 include few or no common categorical terms.

In related embodiments, the link strength analyzer 140 can perform a link strength analysis for each pair of users on a given network or system. For example, the link strength analyzer 140 can analyze the information transactional behavior between each pair of users authorized to use a corporate network to determine a corresponding link strength characteristic or value associated with that particular pair of users. In such embodiments, analysis of the information transactional behavior can include analysis of the frequency of communication and/or content included in the communications, and the related sensitivity levels of that content, to determine the link strength. In some embodiments, the link strength between or the closeness of the relationship between two users can be described as a link strength value. In some embodiments the link strength value can be unit less, such that the link strength values can be used as weighting value in various calculations or analysis.

In yet another embodiment, the link strength analyzer 140 can be configured to use a corporate hierarchy to determine link strength between two users. In such embodiments, the corporate hierarchy or organization chart can be referenced by the link strength analyzer 140. The link strength analyzer 140 then can analyze the positions of a pair of users in the chart to determine a link strength value for that pair of users. For example, the link strength analyzer 140 can analyze or determine the shortest path between the pair of users in the chart as a proxy or estimate for the link strength value between the pair of users.

Both the knowledge profiler 130 and the link strength analyzer 140 can send information to a sensitivity analyzer 150. In some embodiments, the sensitivity analyzer 150 can analyze the distribution of terms and categorical terms among the PKPs 135 generate an estimated sensitivity level for each one of the terms or categorical terms. For example, terms or categorical terms which tend to be evenly distributed among the PKPs 135 can be determined to have a lower sensitivity level in terms or categorical terms which tend to be sparsely distributed (i.e., heavily concentrated) among only a few PKPs 135.

In some embodiments, sensitivity analyzer 150 can analyze a proposed or attempted information transaction to determine a sensitivity level based on the content of the proposed shared information and the link strength determined between a sender and a potential recipient of the information. For example, the sensitivity analyzer 150 can determine that a proposed email with an attached text file, includes one or more terms in the body of the email message or in the contents of the text file that are associated with one or more categorical terms determined to be highly sensitive, i.e. categorical terms that are considered to be company confidential or top-secret.

In addition, the sensitivity analyzer 150 can determine that the proposed email has been addressed to multiple users, each having various link strength values with the sender of the email, as well as unique PKPs. In response thereto, the sensitivity analyzer 150 can analyze the sensitivity level of the terms or categorical terms and the link strength values between the sending user and each of the proposed recipient users and/or the recipient PKPs as some of multiple factors in determining the sensitivity level of the proposed email message. While the example of a proposed email message is described above, the sensitivity analyzer 150 can also analyze terms and/or categorical terms, as well as proposed recipients, in other types of information transactions, such as instant messages or text messages, sent through various systems and networks.

In related embodiments, sensitivity analyzer 150 can also include an alert functionality to generate an alert when a threshold sensitivity is exceeded. In such embodiments, the alert message can include an indication warning the initiating user of the proposed information transaction and/or system administrator of a possible leak of sensitive information. Such alert messages can include an indication of which aspect of the information transaction triggered the alert, i.e., which part of the one or more documents and/or the presence of one or more recipients that caused the determined sensitivity level to exceed a predetermined sensitivity level. In related embodiments, the alert message can also include prohibition of the proposed information transaction. Such embodiments are advantageous in that they do not allow the user to intentionally or inadvertently complete the information transaction that would result in leaking potentially sensitive information.

In some embodiments knowledge profiler 130 can also store a network knowledge profile (NKP) 139. In such embodiments, the knowledge profiler 130 can compile one or more NKPs 139 from information determined by the sensitivity analyzer 150 from the various PKPs 135. In such embodiments, an NKP 139 can be used to analyze a distribution of certain terms and related categorical terms from various PKPs 135 to determine a sensitively level for those terms. For example, PKPs 135 may include information regarding terms and related categorical terms that are so widely spread or disseminated amongst users in the network to which the knowledge profiler 130 is coupled, such that they are determined to have a low sensitivity level. That is, a term that is used so often is most likely not very sensitive. In such embodiments, referencing the NKP 139 allows the sensitivity analyzer 150 to quickly determine whether any detected terms or categorical terms in a proposed or potential information transaction are sensitive. For example in a corporate network, information regarding the corporate softball team or the holiday fundraiser can be determined to be so widely disseminated among the users of the corporate network that any terms or categorical terms associated with the corporate softball team or the holiday fundraiser will be allowed to be shared or sent to any and all users.

In other embodiments, the NKP 139 can include information regarding users who have an assigned or apparent membership to particular groups in the network. For example, an engineering team might be assigned explicitly to a research project and associated with email group regarding a particular research project. Such explicit assignment to such a group can allow the user to receive any and all information that includes terms or categorical terms associated with that research project regardless of how often or strongly that user is associated with the sender or other recipients of a particular information transaction. Alternatively, corporate executives, while not explicitly associated with one another in a predefined group of users, might communicate with one another so frequently about a specific group of topics, e.g. corporate governance or financial regulations, that the sensitivity analyzer and/or the content analyzer can determine that they are implicitly part of a group of users who should have unfettered access to information regarding particular administrative or executive decisions.

Figure 2:
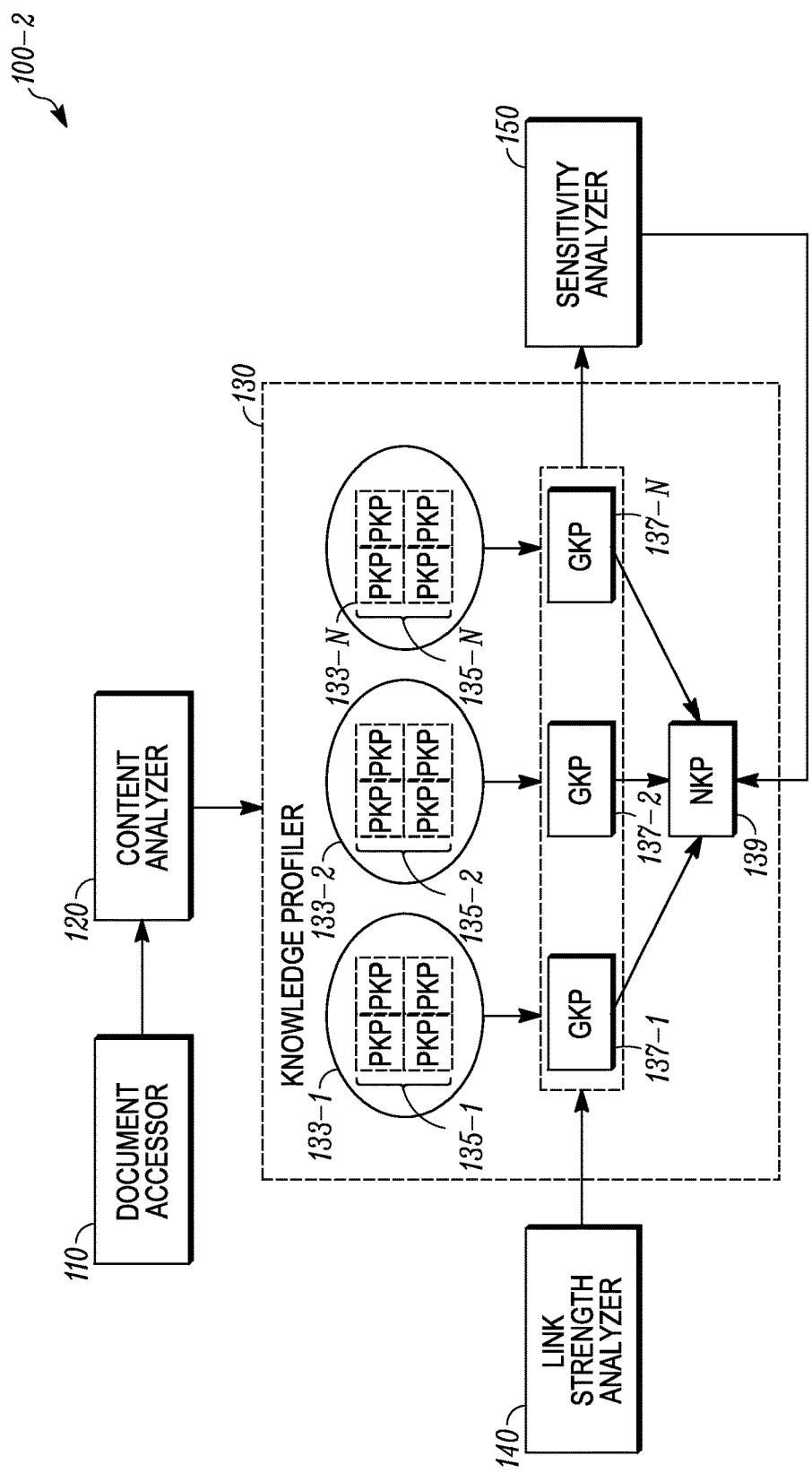
FIG. 2 is a schematic of a system for determining and managing the distribution of sensitive information according to another embodiment of the present disclosure.

FIG. 2 illustrates a system 100-2, similar to system 100-1 of FIG. 1, that includes a variation in the way personal knowledge profiles (PKPs) 135 are stored in the knowledge profiler 130. As shown, the PKPs 135 can be grouped into groups 133 based on the PKPs including a common trait. For example, groups 133 can be determined based on an associated user or user profile belonging to a defined group, such as a department, a research department, circle of friends, etc. In other embodiments, groups 133 can be determined by analysis performed by the content analyzer 120. Such analysis can include determination of the usage of terms and categorical terms as well as the relative frequency of use of such terms among users 210. For example, the knowledge profiler 130 can detect a high concentration of term usage amongst a particular subset of users of all the users 210 in network based on the inclusion of those terms in associated PKPs 135. Based on this detected concentration of terms, the knowledge profiler 130 can group PKPs 135 into the groups 133. In some embodiments, the knowledge profiler 130 can use information received from the link strength analyzer 140 regarding the particular link strength values between various pairs of users within a network to determine the groups 133 of PKPs 135.

In related embodiments, the knowledge of profiler 130 can generate group knowledge profiles (GKP) 137 that can include information regarding the terms and/or categorical terms included in the individual PKPs 135 within a particular group 133. A user's membership in one of the groups 133 can thus be referenced for analysis using a corresponding GKP 137.

Figure 3:
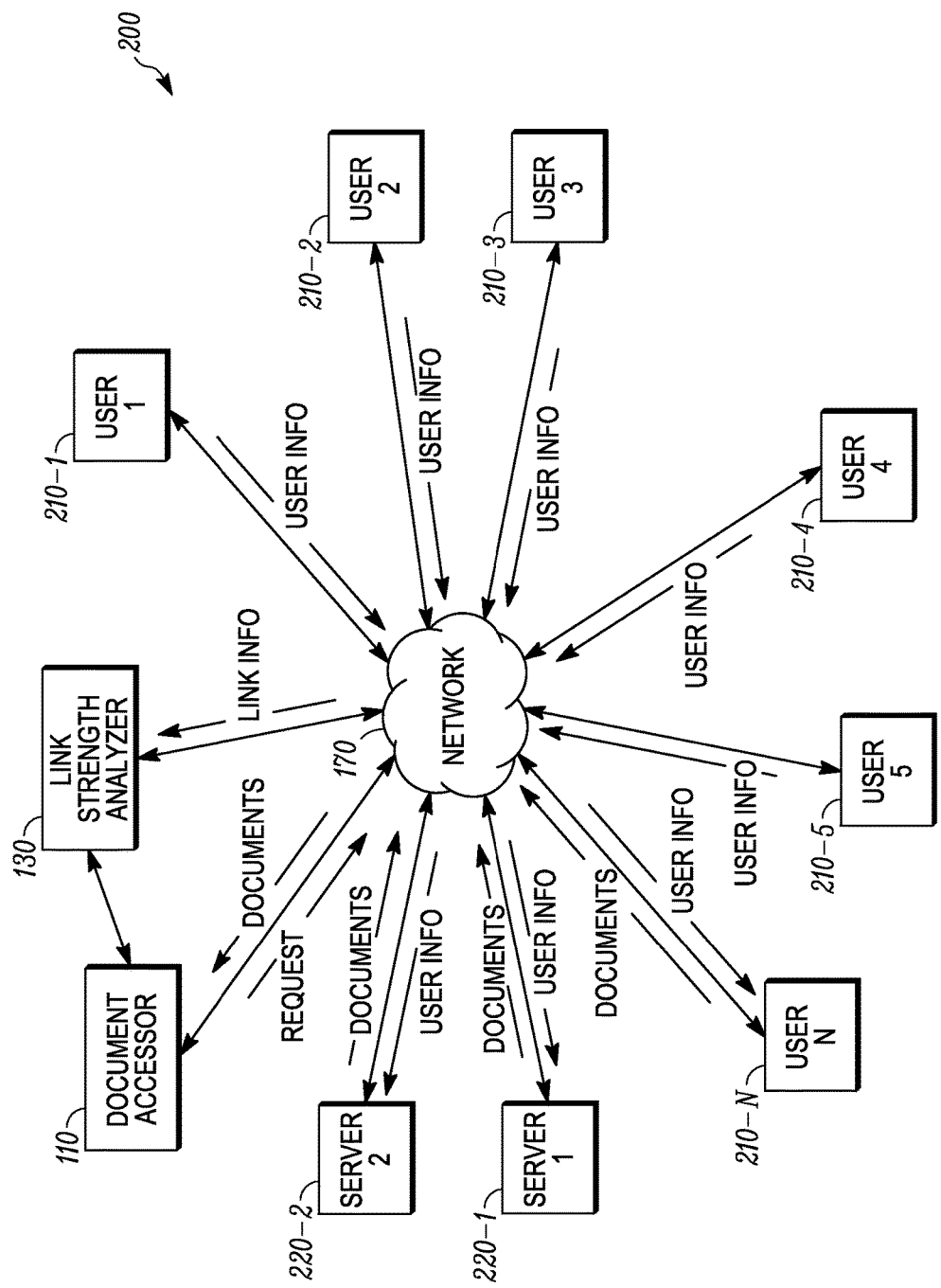
FIG. 3 shows a data flow for collecting user information according to one embodiments of the present disclosure.

FIG. 3 illustrates a system 200 in which the document accessor 110 and the link strength analyzer 130 are coupled to multiple users 210 and servers 220 over a network 170. Network 170 can include various types of open and closed, open source and proprietary networks, such as corporate networks, social media networks, file sharing networks, etc. In some embodiments, network 170 can include a combination of open and closed networks, such as the Internet and a virtual private network (VPN).

As shown, document accessor 110 can send a request for user information (user info) and/or documents to various electronic devices that have network communication capabilities and are associated with one or more users through the network 170. In some embodiments, the request can include simultaneous and/or serialized requests to each of the users 210 to retrieve user information regarding a particular user's logon or access credentials for various systems, servers, and services. In some embodiments, the requests can be sent to the users' primary computing device, while in other embodiments, the requests can be sent to a logon or access credential repository in which one multiple logon or access credentials for multiple users are stored.

In some embodiments, the request for user information can include a request for user names and/or account identifiers along with associated passwords or access codes for all accounts and/or devices associated with each of the users 210. In such embodiments, the request for user information from the document accessor 110 can include requests for manual input from users 210 to supply all such logon or access information. For example, the request for user information can include a link to a website into which a user can enter a plurality of usernames and/or accounts with associated passwords or access codes. In other embodiments, the request for user logon or access information can include an encrypted or secure request to retrieve user information from one or more devices associated with each of the users 210. For example, the request for user information can include a retrieve function or command to access a stored username or account number with associated passwords or access codes from any or all devices associated with the user that are used to access network 170 or interact with other users 210. For example, the request for user information can access a personal computer, laptop computer, a smartphone, PDA, or tablet computer to retrieve stored user account information associated with each device. The document accessor 110 can associate each user with a user profile that contains the specific user logon or access information.

Using the various user logon or access information, document accessor 110 can send one or more requests to servers 220, or other electronic devices (not shown) connected to network 170 to retrieve documents associated with each of the users 210. In such embodiments, the servers 220 can authenticate the user logon or access information before sending one or more documents back to the document accessor 110. For example, server 220-1 can include a social media service for sharing photographs, status updates, and/or party invitations. In response to receiving user authentic logon or access information for a particular user, server 220-1 can send any and all image files for the photographs and/or text files for the status updates or party invitations associated with particular user to the document accessor 110 through network 170. The document accessor 110 can then organize and/or store all of the retrieved documents associated with each of the users 210 in a user profile. In some embodiments, the document accessor 110 can send all or some of the received documents associated with each of the users 210 to link strength analyzer 130.

A link strength analyzer 130 can analyze the contents of the documents associated with each of the users 210 to determine various associations and links among the users 210. In some embodiments, the link strength analyzer 130 can determine the frequency with which each user 210 interacts via various information transactions with each of the other users 210 on network 170. For example, the frequency with which each of users 210 communicates, i.e., sends email messages or text messages, with the other users 210. In related embodiments, the link strength analyzer 130 can also determine the frequency with which each of the users 210 sends or shares documents each of the other users

210. The link strength analyzer 130 can also determine the co-occurrence of terms or categorical terms in the personal knowledge profiles (PKP) 135 for pairs of users 210. For example, the link strength analyzer 130 can count, for each PKP 135, how many and which other PKPs 135 include the same terms or categorical terms. In related embodiments, the link strength analyzer can monitor the interactivity of information transactions among users 210, servers 220, and other devices and services coupled to network 170 in real-time or near real-time to generate link strength values between each of the users 210 and/or augment or update previously determined link strength values between each of the users 210.

Figure 4:
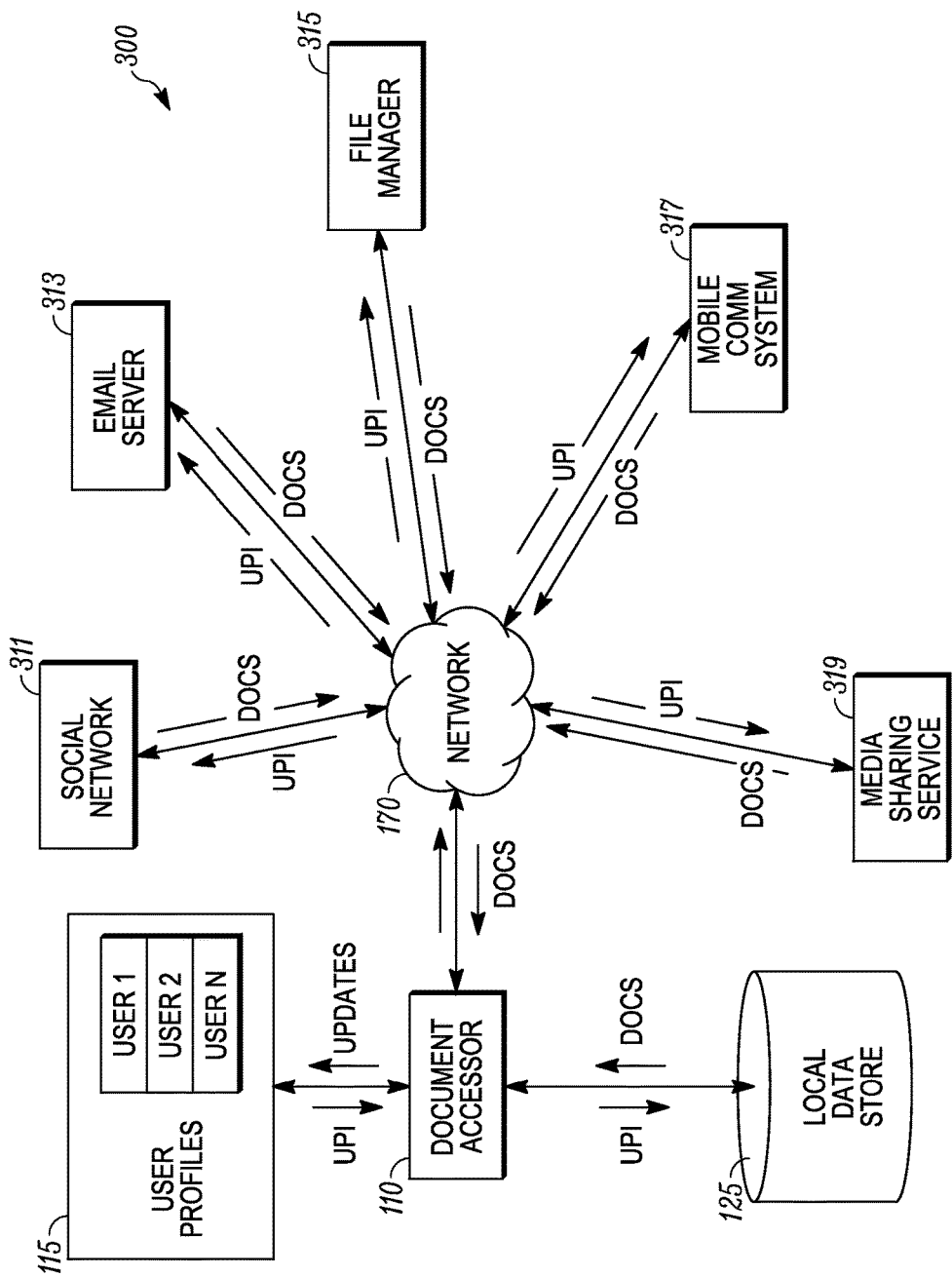
FIG. 4 shows a data flow for retrieving documents and information associated with the number of users according to one embodiment of the present disclosure

FIG. 4 shows a data flow 300 for collecting documents associated with multiple users across multiple networks, servers, or systems, according to various embodiments of the present disclosure. As shown, document accessor 110 can reference or receive user profile information (UPI) from the user profiles 115. Document accessor 110 can send the UPI to one or more networks, servers, systems, or computers coupled to network 170 to access or retrieve documents associated with a corresponding user. In such embodiments, the UPI can include user logon information for accessing a user account associated with various users or user profiles 115. As shown in FIG. 4, document accessor 110 can send simultaneous or serialized requests with UPIs to social network 311, email server 313, file manager 315, mobile communication system (mobile comm system) 317, or a media sharing service 319.

In some embodiments, the UPI sent by document accessor 110 can include user logon information for multiple networks, servers, services, or systems for multiple users. In such embodiments, the UPI can include various user logon or authentication information, such as a username and password, or an account identifier and access code or authentication tokens. In related embodiments, document accessor 110 can send document requests that include the UPI for one or more of the users 210 or user profiles 115 and a document request message or command. In such embodiments, it may be advantageous to collect documents for all the users having user profiles 115 associated with the network 170 to obtain as much information as possible regarding sensitivity levels or characteristics of the received documents as possible, as well as to determine as accurately as possible, link strength values among the various users 210 associate with user profiles 115.

In some embodiments document accessor 110 can also send the UPI to a local data store 125 to receive locally stored documents. For example, document accessor 110 can be hosted or implemented on a local client computer or remote server computer. In such embodiments, the document accessor 110 can access a local data store 125 on the local client computer or the remote server computer to access documents associated with user profiles 115 stored on a local memory, such as a hard drive or solid state drive.

In response to the one or more UPIs and/or document request messages, document accessor 110 can receive, through network 170, a number of documents from social network 311, email server 313, file manager 315, mobile comm system 317, and/or media sharing service 319. When receiving the documents from the various networks, servers, systems, or services, document accessor 110 can store and/or associate the received documents with one or more user profiles 115. In some embodiments, document accessor 110 can store the received documents in the local data store 125 along with an association with one or more of user profiles 115.

Figure 5:
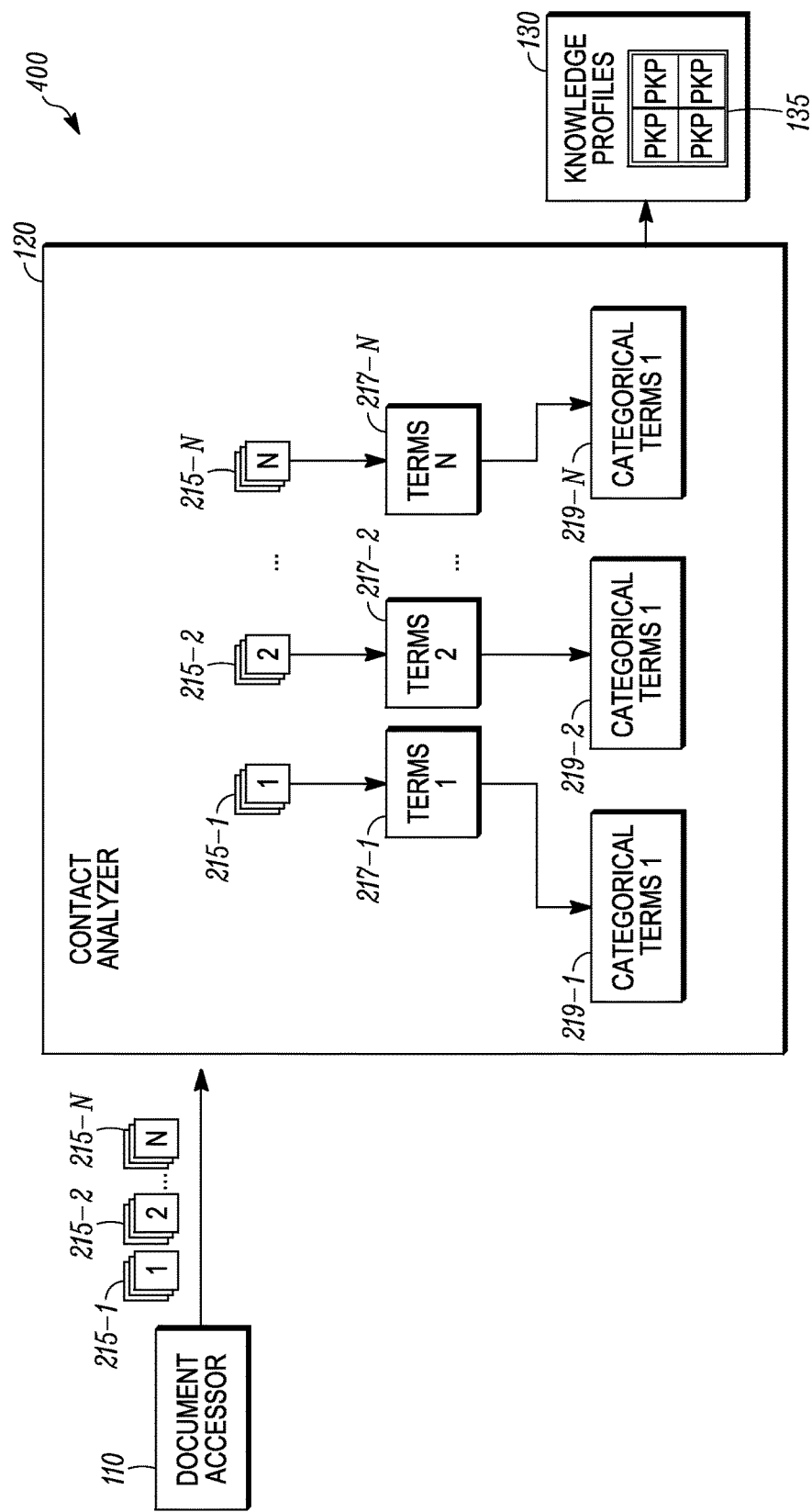
FIG. 5 shows a data flow for analyzing content according to one embodiment of the present disclosure.

FIG. 5 illustrates a data flow 400 for sending documents and analyzing content according to various embodiments of the present disclosure. Document accessor 110 can send one or more sets of documents 215 associated with various users to the content analyzer 120. In some embodiments, each set of documents 215 can be associated with one or more users 210 or user profiles 115.

Content analyzer 120 can extract various information from the documents 215. For example, content analyzer can extract terms 217 from the sets of documents 215. To determine the meaning or intended usage of such terms, the content analyzer 120 can also extract syntactic structures to infer or clarify the context in which the terms 217 are being used. For example, the content analyzer 120 can use a Roslyn Syntax Application Programming Interface (API). In such embodiments, the content analyzer 120 not only looks for individual terms, it can also analyze the syntactic structure in which the terms 217 are used to determine particular meanings, applications, purpose, or use of the terms 217 and/or documents 215 from which the terms 217 were extracted.

In response to the determined terms 217, and their associated meanings, the content analyzer 120 can generate or identify an associated categorical term 219 for each of the terms 217. The categorical terms 219 categorize terms 217 and can include descriptions of topics, subjects, projects, discussion threads, etc., that describe categorical concepts, which may be general or specific concepts or ideas. These categorical concepts can then be associated with a user profile 115 or a user 210. In related embodiments, each categorical term can be associated with a particular user profile 115 or particular user 210. Each categorical term can also be associated with a categorical term frequency that represents or corresponds to a frequency with which an associated term 217 or categorical term 219 occurs in the set of documents 215 associated with each particular user 210. Accordingly, categorical terms 219-1 can include a listing of various categorical concepts associated with user 210-1 in the corresponding user profile 215. Each categorical term in categorical terms 219-1 can include an associated term frequency based on the number of times a term associated with a particular categorical term occurs in the set of documents 215-1 associated with user 210-1.

Accordingly, a user profile 115 or a PKP 135 associated with a user 210-1 can include a listing of categorical terms, keywords or terms, and associated term frequencies for the terms or the categorical terms. In related embodiments, the PKP 135 associated with a particular user 210 can also include a knowledge-level parameter value for each item in the PKP 135 that can indicate the amount or level of knowledge that the particular user associated with the particular PKP 135 has or can have access to with regard to the item or an associated categorical term. The knowledge-level parameter can be used by the sensitivity analyzer 150 to refine the resulting sensitivity analysis.

In other embodiments, for each item in particular PKP 135 with a particular user 210, the PKP 135 can include an indication of other users 210 with whom the particular user 210 has shared information regarding each item. In related embodiments, each item in the particular PKP 135 associated with a particular user 210 can include a listing of other users 210 who have the same or similar item in a PKP 135 associated with each of the other users 210. Accordingly, PKPs 135 that have terms and/or categorical terms in common with other PKPs 135 can list those other PKPs 135, either independently or in conjunction with a particular item.

Figure 6:
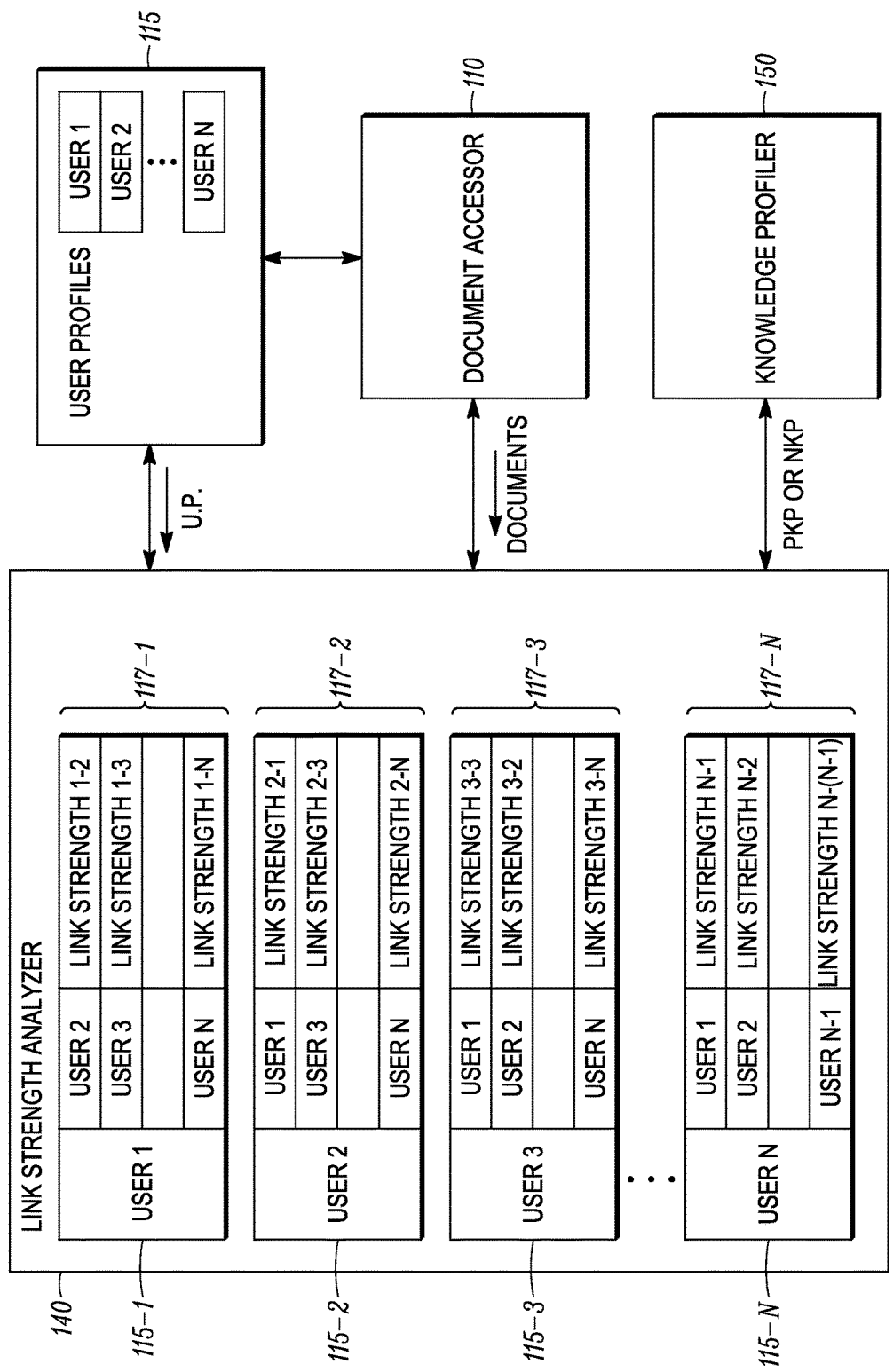
FIG. 6 shows a link strength analyzer with corresponding link strength values for pairs of users according to one embodiment of the present disclosure.

FIG. 6 shows a data flow for generating link strength values pairs of users 210, according to various embodiments of the present disclosure. In such embodiments, the link strength analyzer 140 can collect a number of user profiles 115. For example, link strength analyzer 140 can request and receive the user profiles 115 or link strength analyzer 140 may automatically receive user profiles 115. The link strength analyzer can also receive a number of documents from the document accessor 110. Additionally, the link strength analyzer 140 can collect PKPs 135 and/or NKPs 139 from knowledge profiler 150. The PKPs 135 and/or the NKPs 139 can include various listings of items and frequency values regarding the items.

In response to collecting user profiles 115, documents 215, PKPs 135, and/or NKPs 139, the link strength analyzer 140 can generate pairwise link strength values for each pair of users in the network 170 based on a number of factors. For example, the link strength analyzer 140 can determine a link strength value between various users by analyzing the membership of each of the two users of a pair in a predefined group within one or more networks. For example two users can belong to the same corporate department, research group, or special project team, in which case, the link strength analyzer 140 can determine a high link strength value.

In other embodiments, the link strength analyzer 140 can determine a link strength value for any two users in the network by analyzing the frequency with which the two users communicate, such as the frequency users transmit, share, or exchange information with each other via voice, video, email, text message, instant message, etc. The link strength analyzer 140 can also analyze the contents of the documents 215 and/or the contents of the PKPs 135 to determine the frequency. In related embodiments, the link strength analyzer 140 can determine the frequency with which any two users communicate information with each other for one or more specific items in each user's PKP 135 or in the NKP 139.

In yet other embodiments, the link strength analyzer 140 can determine a link strength value for any two users by analyzing the frequency with which the two users communicate information with each other for one or more items stored in the NKP 139 having a sensitivity classification that is greater than some predetermine value or is otherwise classified as sensitive (e.g., secret, restricted, personal, confidential, etc.).

In response to such analysis the link strength analyzer 140 can edit, such as create or amend and/or augment, user profiles 115 for each user 210 with listings of the other users 210 and/or associated link strength value 117 for that particular user pair. In the example shown in FIG. 5, link strength analyzer 140 can include 1 to N user profiles 115, where N is a natural number, for each of the N users in network 170. As shown, each user profile 115 can include a listing of link strength values 117 corresponding to each pairing with each of the other users 210 in network 170.

Figure 7:
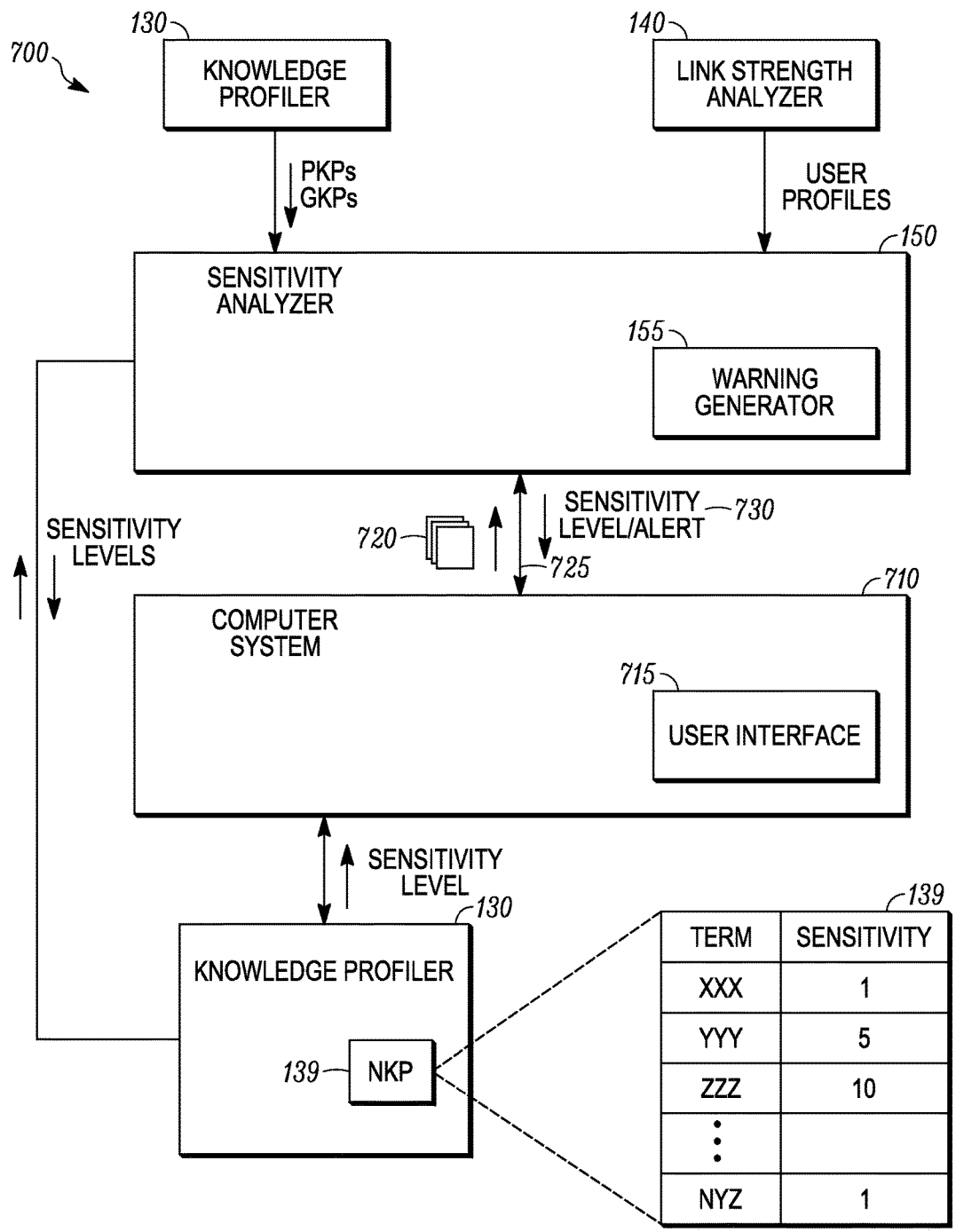
FIG. 7 shows a data flow for determining the sensitivity of a potential information transaction according to one embodiment of the present disclosure.

FIG. 7 illustrates the data flow 700 for estimating categorical term sensitivity according to various embodiments of the present disclosure. As shown, sensitivity analyzer 150 can receive PKPs 135 and GKPs 137 from knowledge profiler 130. The sensitivity analyzer 150 can also receive user profiles that can include link strength values determined for some or all of the pairs of users 210. In such embodiments, the sensitivity analyzer 150 can estimate categorical term sensitivity levels by determining, over the entire network 170, a weighted conditional probability based on the instances of use of terms associated with each categorical term among users with varying link strength values. Accordingly, a categorical term that is only shared in information transactions among users who are closely linked, as indicated by their respective link strength values, can be determined to be, or have a high probability of being, related to sensitive information, such as highly sensitive topics or subjects. In contrast, categorical terms that are shared in information transactions among users who are not necessarily strongly linked, as indicated by the collection of associated link strength values, can be determined not to be highly sensitive. Alternatively, widely distributed categorical terms associated with many unassociated users with low link strength values can be determined to be common knowledge, at least within network 170.

The resulting sensitivity levels can be stored in the NKP 139 of the knowledge profiler 130. FIG. 7 shows an example of NKP 139 as a table of terms with associated estimated sensitivity levels. In this particular example, sensitivity levels are represented by a numerical value. In other embodiments, the sensitivity level can be represented by a classification, such as "top-secret," "confidential," "non-secret", etc. Each sensitivity level can be associated with various levels or groups of levels of security requirements for information transactions that include corresponding categorical terms.

The sensitivity analyzer 150 can monitor the information transactions 720, extract terms from such information transactions, and determine categorical terms and their associated sensitivity levels, in response thereto. In other embodiments, the computer system 710 used to generate or author the proposed information transaction 720 can reference the NKP 139 directly in the knowledge profiler 130 to determine a sensitivity level based on the proposed information recipients and any terms or categorical terms that exists in information transaction 720. The computer system or the sensitivity analyzer 150 can then determine whether the determined sensitivity level exceeds a predetermined or dynamically determined threshold level.

Figure 8:
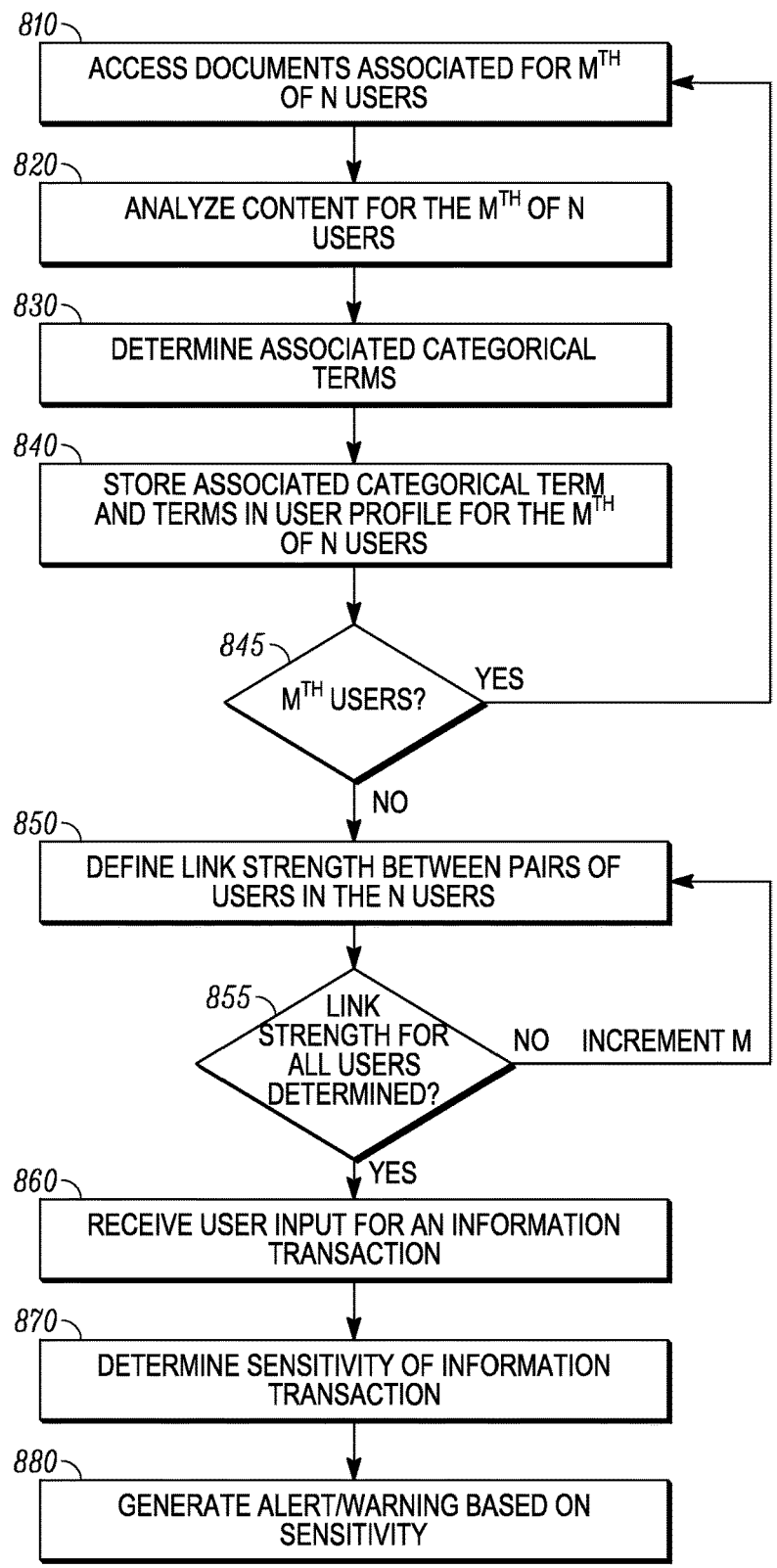
FIG. 8 is a flowchart of a method for determining and managing the distribution of sensitive information according to one embodiment of the present disclosure.

FIG. 8 is a flowchart of a method 800 for identifying and preventing unintended or unauthorized distribution or sharing of sensitive information, according to various embodiments of the present disclosure. The method 800 can begin at action 810 in which a computer system collects documents associated with the $M^{th}$ user of N users, where N is a natural number and M≤N, of a particular service, network, or system. Such documents can include, but are not limited to, emails, instant messages, text messages, video files, image files, stored on multiple client computing systems, such as smartphones, laptop computers, desktop computers, tablet computers, etc., as well as documents stored on a remote server or in a cloud of servers. In some embodiments, only some of the documents associated the $M^{th}$ user of a particular service, network, or system are accessed or retrieved. For example, documents that are manually designated as confidential or proprietary can be skipped or otherwise excluded from the document collection process.

In other embodiments, the number of documents collected for the $M^{th}$ user can be dependent on various user characteristics associated with the $M^{th}$ user. For example, the $M^{th}$ user can be designated as a super user or an administrator may be associated with, or have access, to all documents associated with all users of the system or network. Accordingly, it may be beneficial for the accuracy of various processes performed within method 800 to exclude documents associated with such users. However, in various embodiments, it is advantageous to include as much information as possible from as many documents as possible.

The computer system can maintain or track associations between retrieved or accessed documents and the originally associated $M^{th}$ user, such that any information or data extracted from such documents can be persistently associated with the particular user with whom the documents are associated.

In various embodiments, the computer system can access documents associated with multiple users simultaneously. Accordingly, other actions of method 800 that reference a particular user of the system or network can be achieved in parallel, in series, or a combination thereof. Determination of the manner in which the various actions of method 800 are carried out can be determined by the computer system based on network loads, computer system loads, resource loads, and other networking device related states and characteristics.

In action 820, the computer system can analyze the content of the documents associated with the $M^{th}$ user to extract keywords or terms. In some embodiments, the content analyzer can also analyze the meaning of the extracted keywords or terms by analyzing the context in which the keywords or terms are used within each of the documents. For example, the computer system can analyze the syntactic structure in which the keywords or terms are used. Analysis of syntactic structures can include analyzing the use of the keywords or terms within sentences in relation to other sentences and key phrases or markers, such as titles, footnotes, and parenthetical definitions, to infer meaning, topics, subjects, or discussion threads. Based on the inferred meaning, the computer system can associate each of the keywords or terms with one or more categorical terms, in action 830. The categorical terms can include descriptions and/or descriptors of general or specific concepts or ideas. Such categorical terms can be defined manually by a user, or automatically by the computer system based on the presence of various inferred meanings, topics, subjects, or discussion threads present in the documents associated with the $M^{th}$ user.

Once the content of all the documents for a particular $M^{th}$ user are analyzed, a knowledge profiler can create an $M^{th}$ PKP for the $M^{th}$ user that includes a listing of keywords or terms and/or associated categorical terms, in action 840. In related embodiments, the $M^{th}$ PKP can include relative frequencies for keywords or terms and/or categorical terms based on a frequency with which keywords or terms are used in the documents associated with the $M^{th}$ user. For example, a particular term associated with a particular categorical term might be encountered in every other document associated with the $M^{th}$ user. Accordingly, the $M^{th}$ PKP for the $M^{th}$ user can include an indication of a high frequency of usage for that particular categorical term associated with the term that is encountered in a large proportion of the documents associated with the $M^{th}$ user. In contrast, if keywords or terms associated with another categorical term are only encountered once or twice within all of the documents associated the $M^{th}$ user, then that categorical term can be associated with a low relative term frequency value. In such embodiments, the PKPs associated with the user can be stored to a local or remote data store that is accessible by one or more computer systems or servers.

At determination action 845, the method can repeat actions 810 to 840 for as many as N users of the system or network. Repeating such steps results in multiple PKPs that can include keywords or terms and/or categorical terms associated with various documents for each of the users.

In other embodiments, the computer system can generate a number of GKPs based on information determined from terms and relative frequencies derived from multiple PKPs of users who are members of a group. All such information in a GKP can be based on keywords and terms and/or categorical terms extracted from documents associated with all users from a particular group. Accordingly, the term frequencies associated which each of the categorical terms in a GPK can also be based on the frequencies with which those keywords or terms and/or categorical terms are observed in the documents associated with members in that particular group.

In action 850, the computer system can determine and/or define link strength values between some or all of the pairs of users of the network or system. As used herein, the term link strength value can refer to a metric or other indicator that can describe how closely related two particular users are to one another. For a particular pair of users, the computer system can analyze various attributes regarding the content and frequency with which the pair of users interact with one another in various types of information transactions. For example, the system can monitor the frequency with which to particular users send one another email, text messages, instant messages, etc. Based on historical and or recent trends in communication between two particular users, the computer system can determine that users who communicate frequently are closely linked to one another and assign a corresponding high link strength value or indicator.

In some embodiments, the computer system can determine a link strength value for two particular users by monitoring/determining the frequency with which two users share documents with one another. For example, the computer system can monitor how many documents are created with permissions listing each of the two users. Alternatively, the computer system can monitor how many times a link or password to a document stored on a particular file manager is shared between two users via email, text message, instant message, etc.

In other embodiments, the computer system can determine a link strength value for two particular users by analyzing PKPs associated with each of the users to determine co-occurrences of particular keywords or terms and/or categorical terms occur in each of those PKPs. For example a computer system can access a number of PKPs corresponding to a number of users. The PKPs can be analyzed to determine which PKPs include various keywords or terms and/or categorical terms in common with other PKPs. For example, two PKPs that include multiple common listings of keywords or terms and/or categorical terms, can be determined to be linked to one another. The degree to which the two users are linked can be determined based on the number of common keywords or terms and/or categorical terms and/or associated relative frequency of their usage. In such embodiments, the instance of a particular keyword or terms and/or categorical term in one PKP can be weighted by the associated term frequency value. Accordingly, two PKPs that both include a particular keyword or term and/or categorical term with indications of a high frequency of usage can be determined to be closely linked. In contrast, one of the PKPs may indicate that one of the terms has a high term frequency, while the other PKP may indicate that that particular term is associated with a low term frequency. In such scenarios, the system can determine that two users, while somewhat related, are only loosely linked to one another. Accordingly, the link strength value would be lower for such a pair of users.

In yet other embodiments, the computer system can determine the link strength value for two particular users by determining the membership of each of the users in one or more predefined groups. In such embodiments, the more groups that the two users have in common, the more closely the computer system can determine that they are closely linked to one another. Alternatively, two users who are determined to belong to only one or two common groups can be determined to be loosely linked, while users who are not determined to be included in any common groups, can be determined to not be linked to one another at all.

In related embodiments, the computer system can determine the link strength value for two particular users by analyzing the distance of the two users in an organizational chart for a particular company or social media network. For example, one user may be identified as an executive member of a corporation, e.g., chief executive officer, chief financial officer, or chief technical officer, while another user may be identified as a receptionist in the company. Accordingly, the number of levels between the chief executive officer and a receptionist in the organizational chart for that particular company can indicate that two such users are not closely related. In contrast, a user who is identified as a chief financial officer and a user who is identified as a chief technical officer may only be separated by one or two levels, if any levels, within the same organizational chart for that particular company, thus indicating that those two individual users are closely linked. In some embodiments, the organizational chart can include information regarding membership of users and profiles in particular groups that are defined to be or weighted to be closely linked. Accordingly, the link strength value for such users can be defined to indicate the closeness of the link between the two users.

In determination 855, the computer system can determine whether more pairs of users for which a link strength value need to be determined In embodiments in which all pairs of N users associated with a particular network, system, or service are to be evaluated to determine a link strength value, the computer system would need to evaluate the $_NC_2$ pairs of users, which can be expressed as:

$$\frac{N!}{2!(N-2)!}.$$

In other embodiments, fewer than all of the pairs of users can be analyzed to determine the associated link strength values.

Accordingly, for all user pairs for which a link strength value has been determined, a record or a profile can be created that can be associated with one or both of the pair users with an indication of link strength value. For example, a PKP associated with a particular user can indicate that particular user has a high link strength value with reference to one or more other users. In other embodiments, a separate user profile can be created to indicate that that a particular user is closely linked with one or more other users.

Indications of link strength can be described using various metrics, such as the link strength value or other descriptor, that reference a scale for measuring the link strength between two users. Such scales can include a numeric range of indicators, going from the lowest level, in which two users are not strongly linked to one another, to the highest level, in which the two users are strongly linked to one another, e.g., a scale from 1 to 10. In some embodiments, the scale for link strength can include a binary indicator, with which two users can either be linked or not, e.g., "linked," and "not linked".

In action 860, the computer system can receive user input indicating the initiation of a potential information transaction. In some embodiments, the computer system can monitor the actions of a user using one or more client computing devices, such as a desktop computer, laptop computer, PDA, a smartphone, or tablet computer. In such embodiments, the computer system can continuously or intermittently monitor local or remote user activities to check for potential information transactions. Accordingly, the user input received by the computer system indicating a potential or intended information transaction can include the user operating a remote or local computer program or application, such as an email client or a web browser executing a client application for file sharing. For example, a user may initiate a new email message with a list of intended recipients, having a subject line, and various attachments and content. In another example, a user may enter text or prepare to uploaded image using a web browser executing a social media client application associated with the social media website. In other embodiments, the user input received by the computer system can include a final user control or command, such as a send button in an email client or instant messenger client, or a submit or post button for a social media website. In such embodiments, the final action control operated by the user before information transaction is executed can include the user input received by the computer system in action 860.

In response to the user input received in action 860, the computer system can determine a sensitivity level of intended or potential information transaction in action 870. In such embodiments, determining the sensitivity level of the intended or potential information transaction can include calculating the sensitivity level of categorical terms, or keywords or terms associated with the categorical terms, included in the information transaction. For example, one or more keywords or terms and/or categorical terms can be determined to be included in the subject line or in the content field of email message.

In some embodiments, the sensitivity level $S_T$ of the categorical term T can be defined as $S_T=X_T/Y_T$, where:

$$S_T = X_T/Y_T = \frac{\sum_{UV} L_{UV} k_{UV} h_{UV}}{\sum_{UV} k_{UV} h_{UV}}$$

In which, $L_{UV}$ is link strength value for the link between users U and V, and factor $k_{TUV}=1$ if $f_{TU}>\theta$ and $f_{TV}>\theta$ (where $0 \le \theta \le 1$), otherwise $k_{TUV}=0$, where $f_{TU}$ is the term frequency associated with the term T in the PKP associated with user U and $f_{TV}$ is the term frequency associated with the term T in the PKP associated with user U. $\theta$ is a threshold value for term frequencies that can be changed to avoid false positives or adjust the overall security of systems described herein. The value $h_{UV}$ is define as $h_{UV}=(1+r_{uv})/2$, where $r_{uv}=(L_U \cdot L_V)/(\|L_U\| \|L_V\|)$. $L_U$ is a vector of link strength values between U and all other users in N users, and $L_V$ is a vector of link strength values between V and all other users in N users.

In some embodiments, in which the group membership of user U and V are considered, $L_{UV}=1$ if U and V belong to the same group, otherwise $L_{UV}=0$. Thus, the sensitivity level $S_T$ for each term T detected in a potential or intended information transaction can be determined. In some embodiments, if the $S_T$ for any of the terms detected is greater than some set threshold value, then a flag or pointer can be associated with the information transaction.

Each sensitivity level value, $S_T$, can correspond to a specific classification or sensitivity class. For example, $S_T>100$ can be associated with a "top secret" classification, $100 \geq S_T > 90$ can correspond to a "confidential" classification, $90 \geq S_T > 50$ can correspond to a "proprietary" classification, $50 \geq S_T > 30$ can correspond to a "limited access" classification, while $30 \geq S_T$ can correspond to a "not sensitive" classification. These ranges are only exemplary only. Various other ranges and classifications are possible based on the security needs of the system, service, or network in which embodiments of the present disclosure are implemented.

In action 880, an alert, such as a warning or message, can be generated based on the determined sensitivity value, level, or classification from action 870. In some embodiments, if the $S_T$ for any of the terms detected in the information transaction is greater than some set threshold value, then an alert can be generated for associated with the information transaction. In other embodiments, if one or more of the sensitivity classifications or categories are determined, then a corresponding alert can be generated. In such embodiments, the sensitivity threshold hold can include multiple thresholds.

In some embodiments, the PKP of each recipient is queried for existing information about any of the detected terms. In some embodiments, all terms are checked. In others, only terms which have been determined to be sensitive are evaluated in view of the recipient PKPs. Consider a term t. If the term t is considered to be sensitive, but the recipient already has significant knowledge of t, as determined by access to multiple documents that reference t, then action 880 can be augmented to not issue an alert or to issue a lower level alert.

For example, a user U is about to transmit a content item, I, to user V and the computer system determines that I contains the term T. In some embodiments, the computer system can generate a leak warning to user U if the estimated sensitivity $S_T$ exceeds a certain threshold, such that $S_T>$, where $0 \leq <1$. In other embodiments, if the sender's, U, knowledge of T, as indicated by the frequency of the term T, $f_{TU}$, in the PKP of user U, exceeds the recipient's, V, knowledge of T, as indicated by the frequency of the term T, $f_{TV}$, in the PKP of user V, knowledge, by a threshold value: $f_{TU} > f_{TV} + (1 - f_{TV})\delta$, where $0 \leq \delta < 1$, then the computer system can generate a leak warning to U.

In other embodiments, if the number of users in the organization who possess the knowledge of term, T, exceeds a threshold value such that:

$\Sigma_U k_{TU} > \eta$, where $\eta > 0$, then system can determine that term T is not sensitive. However, if the above threshold condition is not satisfied, then the system could warn the user that there is insufficient evidence to determine whether T is sensitive.

In other embodiments, if the system determines that U belongs to group G and V belongs to group H (G≠H), then the system can provide a leak warning to U if $S_T>$, where $0 \leq <1$; $f_{TG} > f_{TH} + (1 - f_{TH})\varepsilon$, where $0 \leq \varepsilon < 1$; and $\Sigma_U k_{TGH} > \beta$, where $\beta > 0$, are all true.

In yet other embodiments, the system can provide an indication why I is sensitive by presenting a list of the categorical terms derived from 1 that are determined to be sensitive.

Figure 9:
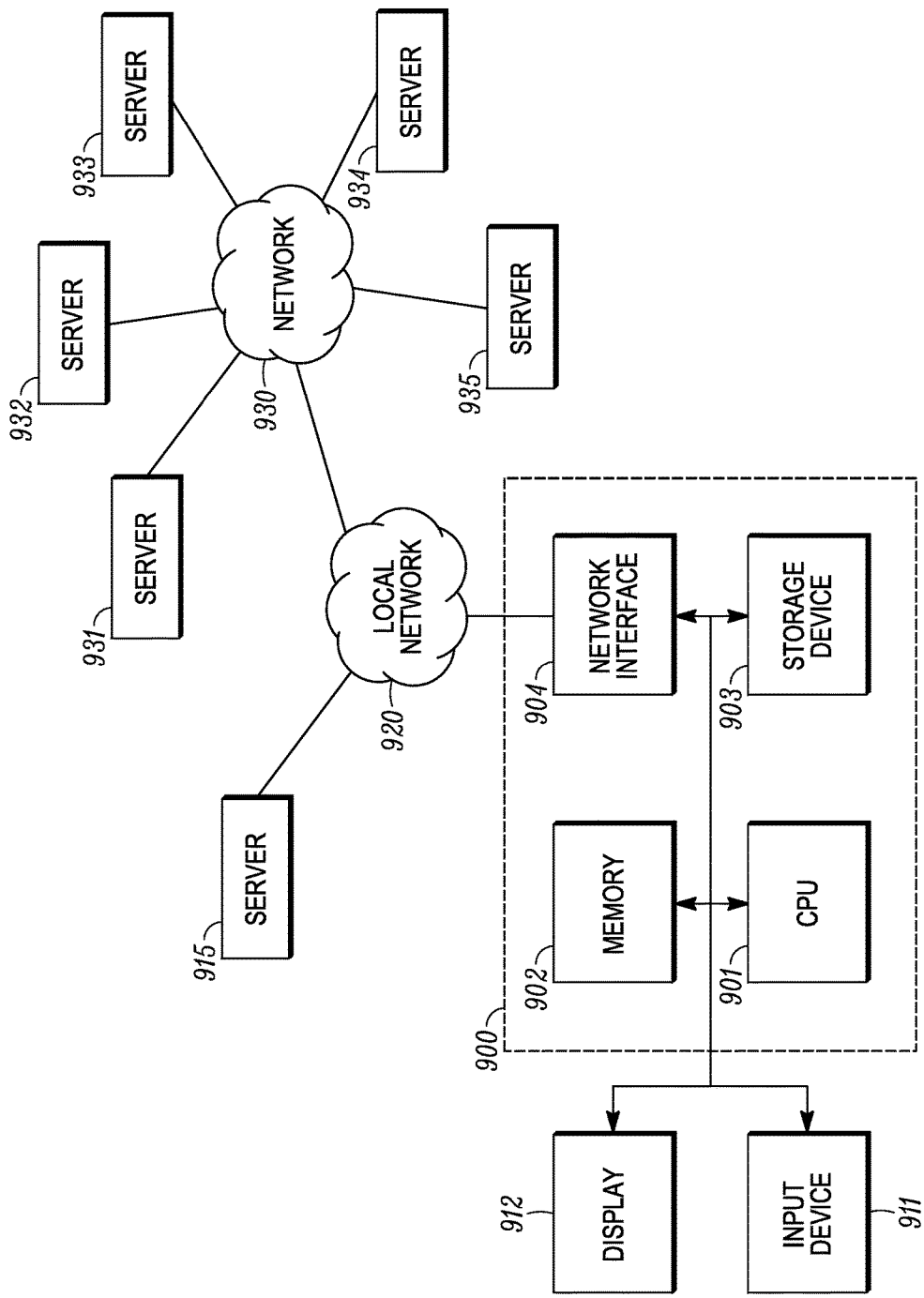
FIG. 9 is schematic of a computer system that can be used implement various embodiments of the present disclosure.

FIG. 9 illustrates an example computer system and networks that may be used to implement one embodiment of the present disclosure. Computer system 910 includes a bus 905 or other communication mechanism for communicating information, and a processor 901 coupled with bus 905 for processing information. Computer system 910 also includes a memory 902 coupled to bus 905 for storing information and instructions to be executed by processor 901, including instructions for performing the techniques described above. This memory may also be used for storing temporary variables or other intermediate information during execution of instructions to be executed by processor 901. Possible implementations of this memory may be, but are not limited to, random access memory (RAM), read only memory (ROM), or both. A storage device 903 is also provided for storing information and instructions. The information instructions can be in the form of computer readable code stored on the storage device, accessible and executable by processor to implement various techniques and methods of the present disclosure. Common forms of storage devices include non-transient, non-volatile computer readable media, for example, a hard drive, a magnetic disk, an optical disk, a CD, a DVD, a flash memory, a USB memory card, or any other medium from which a computer can read.

Computer system 910 may be coupled via the same or different information bus, such as bus 905, to a display 912, such as a cathode ray tube (CRT), liquid crystal display (LCD), or projector for displaying information. An input device 911 such as a keyboard and/or mouse is coupled to a bus for communicating information and command selections from the user to processor 901. The combination of these components allows the user to communicate with the system.

Computer system 910 also includes a network interface 904 coupled with bus 905. Network interface 904 may provide two-way data communication between computer system 910 and the local network 920. The network interface can be a local area network (LAN) card to provide a data communication connection to a compatible LAN. Wireless links is also another example. In any such implementation, network interface 904 sends and receives electrical, electromagnetic, or optical signals that carry digital data streams representing various types of information.

Computer system 910 can send and receive information, including messages or other interface actions, through the network interface 904 to an Intranet or the Internet 930. In the Internet example, software components or services may reside on multiple different computer systems 910 or servers 931 across the network. Software components described above may be implemented on one or more servers. A server 931 may transmit messages from one component, through Internet 930, local network 920, and network interface 904 to a component or container on computer system 910, for example. Software components of a composite application may be implemented on the same system as other components, or on a different machine than other software components. This process of sending and receiving information between software components or one or more containers may be applied to communication between computer system 910 and any of the servers 931 to 935 in either direction. It may also be applied to communication between any two servers 931 to 935.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be operable to perform that which is described in particular embodiments.

As used in the description herein and throughout the claims that follow, "a", "an", and "the" includes plural references unless the context clearly dictates otherwise.

Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method for identifying and preventing leaks of sensitive information, the method comprising:
   in a knowledge profiler implemented on a computer system, the computer system comprising one or more computer processors, generating a plurality of personal knowledge profiles, wherein each personal knowledge profile in the plurality of personal knowledge profiles is associated with a particular user in a plurality of users using a network of electronics devices;
   generating, by a computer-implemented content analyzer in communication with the knowledge profiler of the computer system, the content analyzer implemented using at least one of the one or more computer processors, a plurality of associated inferred meanings for a plurality of terms from a plurality of documents, the documents associated with the plurality of personal knowledge profiles, wherein the plurality of associated inferred meanings for the plurality of terms is generated for each term based at least on a syntactic analysis of the use of the term within a sentence in relation to a usage of the term in a context of the plurality of documents, the context comprising one or more of: another sentence, a title, a footnote, and a parenthetical definition;
   in the content analyzer, using the plurality of associated inferred meanings to generate, for each personal knowledge profile in the plurality of personal knowledge profiles, a plurality of categorical terms based on the plurality of inferred meanings, wherein the plurality of categorical terms generated for each personal knowledge profile categorizes the plurality of terms based on the associated inferred meanings;
   in the knowledge profiler, using the plurality of associated inferred meanings to generate a plurality of associated categorical term frequencies based on a plurality of associated frequencies of term occurrences of terms associated with the categorical terms in each of the plurality of personal knowledge profiles, wherein each of the plurality of associated categorical term frequencies is associated with one of the plurality of categorical terms, and storing the plurality of associated inferred meanings and the plurality of associated categorical term frequencies in corresponding ones of the plurality of personal knowledge profiles;
   determining, by a computer-implemented sensitivity analyzer in communication with the knowledge profiler of the computer system, the sensitivity analyzer implemented using at least one of the one or more computer processors, a plurality of sensitivity level values for the plurality of categorical terms based on the plurality of associated categorical term frequencies;
   determining, by at least one of the one or more computer processors of the computer system, a plurality of link strength values, wherein:
      each of the link strength values is associated respectively with a pair of personal knowledge profiles in a plurality of personal knowledge profiles,
      each of the plurality of personal knowledge profiles is associated with a user in the plurality of users,
      the determining of each of the link strength values is based on an occurrence of common terms in its associated pair of personal knowledge profiles, such that each of the plurality of link strength values describes a relationship between an associated pair of users in the plurality of users, and
      sensitivity level values in the plurality of sensitivity level values are further based on the plurality of link strength values;
   storing, by the knowledge profiler of the computer system, the plurality of sensitivity level values for the plurality of categorical terms, wherein the plurality of sensitivity level values are used to analyze whether an information transaction comprising at least one of the plurality of terms is permitted;
   detecting, by the computer system, a first information transaction between a first pair of users in the plurality of pairs of users that includes a first term associated with a first categorical term in the plurality of categorical terms;
   determining a first sensitivity level value for the first categorical term;
   generating an alert in response to the first sensitivity level value; and
   automatically blocking the information transaction in response to the alert.

2. The method of claim 1, further comprising determining, by the computer system, a distribution of the plurality of terms among the plurality of personal knowledge profiles, and wherein the plurality of sensitivity level values are further based on the distribution of the plurality of terms among the plurality of personal knowledge profiles.

3. The method of claim 1, wherein determining the plurality of sensitivity level values further comprises calculating a plurality of weighted conditional probabilities based on the plurality of link strength values and the plurality of personal knowledge profiles.

4. The method of claim 3, wherein each of the plurality of personal knowledge profiles comprises information regarding a level of knowledge that a user associated with a personal knowledge profile possesses regarding the categorical terms in the personal knowledge profile associated with the user.

5. The method of claim 1, wherein determining a plurality of link strength values further comprises monitoring a plurality of frequencies associated with the plurality of pairs of user, wherein each of the plurality of frequencies corresponds to an associated frequency with which each of the plurality of pairs of users conduct information transactions.

6. The method of claim 1, wherein generating the alert comprises comparing the first sensitivity level to a threshold sensitivity level value associated with a first user or a second user in the first pair of users.

7. The method of claim 1, wherein the alert comprises a message displayed to a first user in the first pair of users regarding a sensitivity of the first information transaction.

8. The method of claim 1, wherein the plurality of documents comprises one or more of: email messages, social media posts, social media feeds, shared-access documents, and audio-visual files.

9. A non-transitory computer-readable medium comprising stored instructions which, when executed using at least one computer processor, cause the at least one computer processor to perform steps of a method for identifying and preventing leaks of sensitive information, the method comprising:
in a knowledge profiler implemented on a computer system, the computer system comprising one or more computer processors, generating a plurality of personal knowledge profiles, wherein each personal knowledge profile in the plurality of personal knowledge profiles is associated with a particular user in a plurality of users using a network of electronics devices;
generating, by a computer-implemented content analyzer in communication with the knowledge profiler of the computer system, the content analyzer implemented using at least one of the one or more computer processors, a plurality of associated inferred meanings for a plurality of terms from a plurality of documents, the documents associated with the plurality of personal knowledge profiles, wherein the plurality of associated inferred meanings for the plurality of terms is generated for each term based at least on a syntactic analysis of the use of the term within a sentence in relation to a usage of the term in a context of the plurality of documents, the context comprising one or more of: another sentence, a title, a footnote, and a parenthetical definition;
in the content analyzer, using the plurality of associated inferred meanings to generate, for each personal knowledge profile in the plurality of personal knowledge profiles, a plurality of categorical terms based on the plurality of inferred meanings, wherein the plurality of categorical terms generated for each personal knowledge profile categorizes the plurality of terms based on the associated inferred meanings;
in the knowledge profiler, using the plurality of associated inferred meanings to generate a plurality of associated categorical term frequencies based on a plurality of associated frequencies of term occurrences of terms associated with the categorical terms in each of the plurality of personal knowledge profiles, wherein each of the plurality of associated categorical term frequencies is associated with one of the plurality of categorical terms, and storing the plurality of associated inferred meanings and the plurality of associated categorical term frequencies in corresponding ones of the plurality of personal knowledge profiles;
determining, by a computer-implemented sensitivity analyzer in communication with the knowledge profiler of the computer system, the sensitivity analyzer implemented using at least one of the one or more computer processors, a plurality of sensitivity level values for the plurality of categorical terms based on the plurality of associated categorical term frequencies;
determining, by at least one of the one or more computer processors of the computer system, a plurality of link strength values, wherein: each of the link strength values is associated respectively with a pair of personal knowledge profiles in a plurality of personal knowledge profiles, each of the plurality of personal knowledge profiles is associated with a user in the plurality of users, the determining of each of the link strength values is based on an occurrence of common terms in its associated pair of personal knowledge profiles, such that each of the plurality of link strength values describes a relationship between an associated pair of users in the plurality of users, and sensitivity level values in the plurality of sensitivity level values are further based on the plurality of link strength values;
storing, by the knowledge profiler of the computer system, the plurality of sensitivity level values for the plurality of categorical terms, wherein the plurality of sensitivity level values are used to analyze whether an information transaction comprising at least one of the plurality of terms is permitted;
detecting, by the computer system, a first information transaction between a first pair of users in the plurality of pairs of users that includes a first term associated with a first categorical term in the plurality of categorical terms;
determining a first sensitivity level value for the first categorical term;
generating an alert in response to the first sensitivity level value; and
automatically blocking the information transaction in response to the alert.

10. A computer system for identifying and preventing leaks of sensitive information, the computer system comprising:
one or more computer processors communicatively coupled to a memory, the one or more computer processors configured for:
in a knowledge profiler implemented on the computer system, generating a plurality of personal knowledge profiles, wherein each personal knowledge profile in the plurality of personal knowledge profiles is associated with a particular user in a plurality of users using a network of electronics devices;
generating, by a computer-implemented content analyzer in communication with the knowledge profiler of the computer system, the content analyzer implemented using at least one of the one or more computer processors, a plurality of associated inferred meanings for a plurality of terms from a plurality of documents, the documents associated with the plurality of personal knowledge profiles, wherein the plurality of associated inferred meanings for the plurality of terms is generated for each term based at least on a syntactic analysis of the use of the term within a sentence in relation to a usage of the term in a context of the plurality of documents, the context comprising one or more of: another sentence, a title, a footnote, and a parenthetical definition;
in the content analyzer, using the plurality of associated inferred meanings to generate, for each personal knowledge profile in the plurality of personal knowledge profiles, a plurality of categorical terms based on the plurality of inferred meanings, wherein the plurality of categorical terms generated for each personal knowledge profile categorizes the plurality of terms based on the associated inferred meanings;
in the knowledge profiler, using the plurality of associated inferred meanings to generate a plurality of associated categorical term frequencies based on a plurality of associated frequencies of term occurrences of terms associated with the categorical terms in each of the plurality of personal knowledge profiles, wherein each of the plurality of associated categorical term frequencies is associated with one of the plurality of categorical terms, and storing the plurality of associated inferred meanings and the plurality of associated categorical term frequencies in corresponding ones of the plurality of personal knowledge profiles;

determining, by a computer-implemented sensitivity analyzer in communication with the knowledge profiler of the computer system, the sensitivity analyzer implemented using at least one of the one or more computer processors, a plurality of sensitivity level values for the plurality of categorical terms based on the plurality of associated categorical term frequencies;

determining, by at least one of the one or more computer processors of the computer system, a plurality of link strength values, wherein: each of the link strength values is associated respectively with a pair of personal knowledge profiles in a plurality of personal knowledge profiles, each of the plurality of personal knowledge profiles is associated with a user in the plurality of users, the determining of each of the link strength values is based on an occurrence of common terms in its associated pair of personal knowledge profiles, such that each of the plurality of link strength values describes a relationship between an associated pair of users in the plurality of users, and sensitivity level values in the plurality of sensitivity level values are further based on the plurality of link strength values;

storing, by the knowledge profiler of the computer system, the plurality of sensitivity level values for the plurality of categorical terms, wherein the plurality of sensitivity level values are used to analyze whether an information transaction comprising at least one of the plurality of terms is permitted;

detecting, by the computer system, a first information transaction between a first pair of users in the plurality of pairs of users that includes a first term associated with a first categorical term in the plurality of categorical terms;

determining a first sensitivity level value for the first categorical term;

generating an alert in response to the first sensitivity level value; and automatically blocking the information transaction in response to the alert.

* * * * *